(12) United States Patent
Kataoka et al.

(10) Patent No.: US 11,984,723 B2
(45) Date of Patent: May 14, 2024

(54) MULTI-MODE POWER SUPPLY SYSTEM

(71) Applicant: Mitsubishi Electric Corporation, Tokyo (JP)

(72) Inventors: Takuya Kataoka, Tokyo (JP); Kikuo Izumi, Tokyo (JP); Yusuke Higaki, Tokyo (JP); Takushi Jimichi, Tokyo (JP); Tsuguhiro Takuno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 148 days.

(21) Appl. No.: 17/603,341

(22) PCT Filed: Jun. 5, 2019

(86) PCT No.: PCT/JP2019/022381
§ 371 (c)(1),
(2) Date: Oct. 13, 2021

(87) PCT Pub. No.: WO2020/245951
PCT Pub. Date: Dec. 10, 2020

(65) Prior Publication Data
US 2022/0181879 A1    Jun. 9, 2022

(51) Int. Cl.
*H02J 3/12* (2006.01)
*G05B 15/02* (2006.01)
*H02M 7/04* (2006.01)

(52) U.S. Cl.
CPC ............... *H02J 3/12* (2013.01); *G05B 15/02* (2013.01); *H02M 7/04* (2013.01)

(58) Field of Classification Search
None
See application file for complete search history.

(56) References Cited

U.S. PATENT DOCUMENTS

2002/0030473 A1    3/2002  Utsunomiya
2003/0230935 A1*  12/2003  Radley .................... H02J 9/005
                                                                    307/64
(Continued)

FOREIGN PATENT DOCUMENTS

JP            9-65648 A      3/1997
JP        2002-51459 A      2/2002
(Continued)

OTHER PUBLICATIONS

Extended European Search Report dated May 16, 2022 in European Application No. 19931831.2.
(Continued)

*Primary Examiner* — Nathan L Laughlin
(74) *Attorney, Agent, or Firm* — XSENSUS LLP

(57) ABSTRACT

A power supply system includes a power converter, a load state detector, and a controller. The power converter converts AC power received from the main power source into DC power with a voltage in accordance with a distribution voltage command value Vref and supplies the DC power to the load. The load state detector detects an operating state of the load. The controller operates in an operation mode selected from among a plurality of operation modes and generates the distribution voltage command value Vref. The operation modes include a distribution voltage control mode in which the distribution voltage command value Vref is generated based on load operating information detected by the load state detector and a distribution voltage fixed mode in which a predetermined setting value or an external command value acquired from an external device is set as the distribution voltage command value Vref.

18 Claims, 8 Drawing Sheets

(56) References Cited

U.S. PATENT DOCUMENTS

| | | | |
|---|---|---|---|
| 2007/0005205 A1* | 1/2007 | Bernardi | B60L 1/003 |
| | | | 701/36 |
| 2007/0063736 A1 | 3/2007 | Biagi | |
| 2008/0218503 A1* | 9/2008 | Lee | H02M 3/33561 |
| | | | 323/205 |
| 2011/0248688 A1 | 10/2011 | Iacob et al. | |
| 2015/0357815 A1* | 12/2015 | Luh | G06F 1/26 |
| | | | 307/31 |
| 2016/0131686 A1* | 5/2016 | Handley | H02J 13/00017 |
| | | | 324/76.11 |
| 2020/0081504 A1* | 3/2020 | Ou Yang | H02J 1/106 |

FOREIGN PATENT DOCUMENTS

| | | |
|---|---|---|
| JP | 2002-335630 A | 11/2002 |
| JP | 2009-159693 A | 7/2009 |
| JP | 5092997 B2 | 12/2012 |
| JP | 2015-122862 A | 7/2015 |
| TW | 201211716 A | 3/2012 |

OTHER PUBLICATIONS

International Search Report and Written Opinion dated Aug. 13, 2019, received for PCT Application PCT/JP2019/022381, Filed on Jun. 5, 2019, 10 pages including English Translation.

* cited by examiner

MULTI-MODE POWER SUPPLY SYSTEM

CROSS-REFERENCE TO RELATED APPLICATION

The present application is based on PCT filing PCT/JP2019/022381, filed Jun. 5, 2019, the entire contents of which are incorporated herein by reference.

TECHNICAL FIELD

The present invention relates to a power supply system that distributes and supplies electric power to a plurality of loads.

BACKGROUND ART

Power storage batteries have been increasingly used to make use of renewable energy and cope with power failures. For example, a DC power supply and distribution system that supplies and distributes DC power is used as a power supply system used in application of power storage batteries. DC power supply and distribution systems are advantageous in that the number of times of power conversion is reduced and cost efficiency is improved because DC power output from a DC power source is output without being converted into AC power. In addition, there is a high degree of flexibility because the standards of output voltage of DC power supply and distribution systems are not decided yet. A DC power supply and distribution system has been proposed which outputs DC power with a voltage in accordance with a load to the load.

For example, Japanese Patent No. 5092997 (PTL 1) discloses a system power source that supplies a power supply voltage to a load circuit having a plurality of load regions. This system power source includes a plurality of voltage conversion circuits (DC/DC converters) provided respectively corresponding to the load regions in the load circuit, a data table in which an optimum power supply voltage for current consumption in each load region is stored in advance for each of the load regions, a current detector to detect current consumption of the load circuit, and a voltage controller to perform a process for supplying an optimum power supply voltage corresponding to current consumption of the load circuit to the load circuit by referring to the data table.

CITATION LIST

Patent Literature

PTL 1: Japanese Patent No. 5092997

SUMMARY OF INVENTION

Technical Problem

However, in the system power source described in PTL 1, it is necessary to provide voltage conversion circuits as many as the loads and the data table in order to handle a plurality of loads different in characteristics, and the cost of the entire system is increased.

The present disclosure is made in order to solve the problem described above, and an object of the present disclosure is to provide a power supply system capable of improving load efficiency with lower costs.

Solution to Problem

A power supply system according to the present disclosure is a power supply system to supply power to a load and includes a converter, a detector, and a controller. The converter converts AC power or DC power received from a main power source into power with a voltage in accordance with a voltage command value and supplies the converted power to the load. The detector detects an operating state of the load. The controller operates in an operation mode selected from among a plurality of operation modes and generates the voltage command value. The operation modes include a first mode in which the distribution voltage command value is generated based on the operating state of the load detected by the detector and a second mode in which the voltage command value is generated based on predetermined setting information or external command information acquired from an external device.

Advantageous Effects of Invention

The present disclosure provides a power supply system capable of improving load efficiency with lower costs.

DESCRIPTION OF EMBODIMENTS

Figure 1:
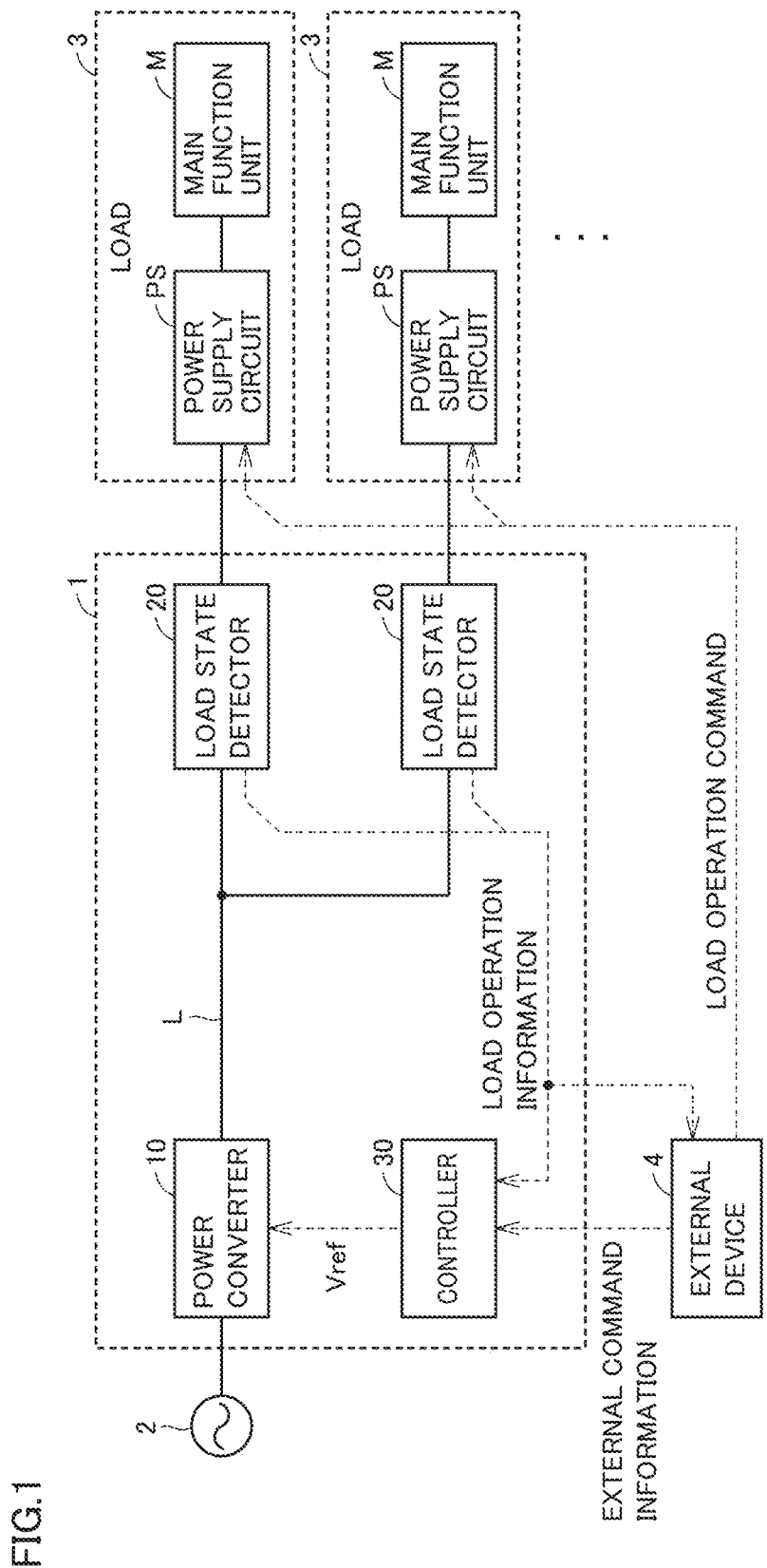
FIG. 1 is a first diagram schematically showing a configuration of a power supply system.

Embodiments of the present disclosure will be described in detail with reference to the drawings. Like or corresponding parts in the drawings are denoted by like reference signs and a description thereof is not repeated.

First Embodiment

<Configuration of Power Supply System>

FIG. 1 is a diagram schematically showing a configuration of a power supply system 1 according to a first embodiment of the present invention. Power supply system 1 is connected to a main power source 2 and a plurality of loads 3. Power supply system 1 converts AC power supplied from main power source 2 into DC power and supplies and distributes the converted DC power to a plurality of loads 3 through a DC power line L. In other words, power supply system 1 is a DC power supply and distribution system that supplies and distributes DC power to loads.

A plurality of loads 3 are controlled by a load operation command received from an external device 4 separate from power supply system 1. External device 4 includes a device such as an energy management system (EMS) or a server. External device 4 monitors a power distribution state of DC power line L and an operating state of loads 3, generates a load operation command based on the result, and outputs the load operation command to loads 3.

Each of a plurality of loads 3 includes a power supply circuit PS and a main function unit M. Power supply circuit PS converts power received from DC power line L into power suitable for main function unit M and outputs the converted power to main function unit M. Main function unit M is configured to operate on power supplied from power supply circuit PS.

Power supply system 1 includes, in addition to the DC power line L described above, a power converter 10, a plurality of load state detectors 20, and a controller 30.

Load state detector 20 detects power consumption of load 3, current flowing through load 3, and the like and outputs the detected results as load operating information to controller 30. Load state detector 20 may have a function of acquiring a load operation command received by load 3 from external device 4 from load 3 and outputting the acquired result to controller 30 and external device 4.

External device 4 outputs external command information to controller 30. The external command information includes load operating information received from load state detector 20 and information for use in generation of a distribution voltage command value Vref by controller 30. The information for use in generation of a distribution voltage command value Vref includes the distribution voltage command value Vref per se or a rated voltage of load 3 and the like as will be described later.

Controller 30 includes a central processing unit (CPU), a memory, an input/output buffer, though not illustrated. Controller 30 generates a distribution voltage command value Vref based on the load operating information from load state detector 20 and the external command information from external device 4 and outputs the generated distribution voltage command value Vref to power converter 10.

Power converter 10 is connected to main power source 2. Power converter 10 is also connected to a plurality of loads 3 through DC power line L. Power converter 10 converts AC power received from main power source 2 into DC power with a voltage in accordance with the distribution voltage command value Vref from controller 30 and outputs the converted DC power to DC power line L. The output voltage of power converter 10 is thus supplied to a plurality of loads 3 through DC power line L.

The optimum operating voltages of loads 3 vary with the kinds of loads 3. The kinds of loads 3 are classified into general loads such as lighting devices and office automation devices and power loads such as air conditioning devices. When power supply system 1 is applied to factories, the power loads include factory power loads such as conveyors and press machines. Since the general loads and the power loads have significantly different operating characteristics, they are classified as different kinds of loads 3, and a voltage suitable for each individual load is supplied, whereby the efficiency of each load 3 can be improved.

<Operation of Power Supply System>

The operation of power supply system 1 will now be described. Power converter 10 is connected to a plurality of loads 3 through DC power line L. Here, it is preferable that a plurality of loads 3 are of the same kind, if possible.

In general, in an AC power supply and distribution system that supplies and distributes power to loads, the voltage of AC power distributed to the loads is standardized. On the other hand, in a DC power supply and distribution system like power supply system 1 according to the present embodiment, the voltage of DC power distributed to loads is not standardized, and there is flexibility in magnitude of voltage distributed to loads, compared with the AC power supply and distribution system. The power efficiency in loads 3 is expected to be improved more when the voltage of DC power output to DC power line L by power converter 10 (hereinafter simply referred to as "distribution voltage") is changed in accordance with the state of loads 3. However, it is preferable that the distribution voltage is limited within an input voltage limit range set for each load 3 in order not to interrupt the operation of load 3. The input voltage limit range may vary based on an operating state of each load 3.

Based on the foregoing points, controller 30 according to the present embodiment is configured to operate in an operation mode selected from among a plurality of operation modes and generate a distribution voltage command value Vref A plurality of operation modes include a distribution voltage control mode (first mode) and a distribution voltage fixed mode (second mode). The distribution voltage control mode and the distribution voltage fixed mode will be described in order below.

<Distribution Voltage Control Mode>

The distribution voltage control mode is a mode in which a distribution voltage command value Vref is determined and generated based on the load operating information acquired from load state detector 20 such that power consumption of a plurality of loads 3 is minimized or the power efficiency of a plurality of loads 3 is optimized.

In the present embodiment, a method of adjusting the distribution voltage command value Vref such that power consumption of a plurality of loads 3 is minimized in the distribution voltage control mode will be described.

Power consumption of load 3 can be represented by the sum of power consumption in main function unit M and loss caused in power supply circuit PS. The power consumption of main function unit M hardly changes when the load operation command to load 3 is constant. Therefore, the power consumption of load 3 can be minimized and cost efficiency can be improved by adjusting the distribution voltage command value Vref such that loss in power supply circuit PS is reduced.

Figure 2:
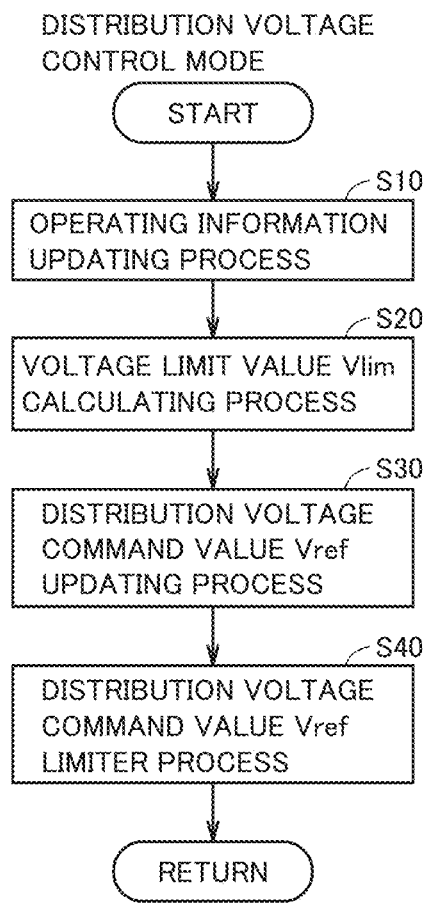
FIG. 2 is a flowchart showing an example of a process performed when a controller operates in a distribution voltage control mode.

FIG. 2 is a flowchart showing an example of a process performed when controller 30 operates in the distribution voltage control mode. This flowchart is repeatedly performed every time a predetermined condition is satisfied (for example, in predetermined cycles).

First of all, controller 30 performs a process of updating operating information of a plurality of loads 3 (step S10). For example, controller 30 acquires load operating information from load state detectors 20 and records the acquired load operating information into a memory in order to grasp the operating state of a plurality of loads 3 at present. The load operating information recorded in a computation cycle this time is used as the previous value of load operating information in the next computation cycle.

Subsequently, controller 30 performs a process of calculating an acceptable range R of the distribution voltage command value Vref (step S20). The acceptable range R is set as a range from an upper limit value Vlimhi to a lower limit value Vlimlow. Controller 30 calculates the upper limit value Vlimhi and the lower limit value Vlimlow in the acceptable range R, for example, based on the load operating information.

The upper limit value Vlimhi and the lower limit value Vlimlow in the acceptable range R are not limited to values calculated based on the load operating information and may be, for example, predetermined fixed values according to the specifications of loads 3.

For the upper limit value Vlimhi and the lower limit value Vlimlow in the acceptable range R, fixed values and calculated values may be selectively used depending on the kind of load 3. For example, when load 3 is a general load, the voltage required for load 3 less fluctuates with the operating state of load 3. In view of this, the upper limit value Vlimhi and the lower limit value Vlimlow in the acceptable range R may be predetermined fixed values according to the specifications of load 3. On the other hand, when load 3 is a power load such as a motor, the voltage required for load 3 may fluctuate greatly with the operating state of load 3. This is because induced voltage from a motor that is a power load fluctuates greatly with the rotation speed of the motor. In view of this, when load 3 is a power load such as a motor, the upper limit value Vlimhi and the lower limit value Vlimlow in the acceptable range R may be varied based on the operating state of the power load (for example, the rotation speed of the motor).

Subsequently, controller 30 performs an update process of the distribution voltage command value Vref (step S30). In this process, effect verification is performed as to whether power consumption of load 3 has been reduced by varying the distribution voltage command value Vref in the previous computation cycle, and it is determined whether the updating direction of the distribution voltage command value Vref is set to the increasing direction or the decreasing direction, in accordance with the result of validation. Specifically, controller 30 compares the value of load operating information this time with the previous value of load operating information to determine the direction to vary the power consumption of load 3. Then, if the power consumption of load 3 is reduced or not changed, controller 30 varies the distribution voltage command value Vref in the same direction as the previous one. If the power consumption of load 3 is increased, controller 30 varies the distribution voltage command value Vref in a direction opposite to the previous one.

For example, controller 30 updates the distribution voltage command value Vref in the following manner. If the power consumption of load 3 is reduced or not changed, controller 30 updates the distribution voltage command value Vref as indicated by the following Equation (1).

$$Vref = Vref + \Delta V \times F \quad (1)$$

On the other hand, if the power consumption of load 3 is increased, controller 30 reverses the sign of an adjustment direction flag F as indicated by the following Equation (2) and updates the distribution voltage command value Vref as indicated by the following Equation (3).

$$F = F \times (-1) \quad (2)$$

$$Vref = Vref + \Delta V \times F \quad (3)$$

In Equation (1) and Equation (3), "Vref" in the left side is the distribution voltage command value Vref after update, "Vref" in the right side is the distribution voltage command value Vref before update, and "ΔV" is a predetermined minute voltage. "F" in the right side is the adjustment direction flag, which is a parameter for determining the updating direction of the distribution voltage command value Vref. The initial value of the adjustment direction flag F can be set to "1" or "−1".

In this way, when the power consumption of load 3 is reduced or not changed, the distribution voltage command value Vref can be varied in the same direction as the previous one, and when the power consumption of load 3 is increased, the distribution voltage command value Vref can be varied in a direction opposite to the previous one. With such a process repeated, the distribution voltage command value Vref can be adjusted such that the power consumption of load 3 is minimized (minimal).

Subsequently, controller 30 performs a limiter process of the distribution voltage command value Vref (step S40). Specifically, when the distribution voltage command value Vref after update calculated at step S30 does not fall within the acceptable range R calculated at step S20, controller 30 limits the distribution voltage command value Vref such that the distribution voltage command value Vref falls within the acceptable range R.

The distribution voltage control mode is a mode in which the distribution voltage command value Vref is updated in a direction to reduce the power consumption of load 3 by comparing the value of load operating information this time with the previous value. Therefore, if the distribution voltage command value Vref is fixed to the upper limit value Vlimhi or the lower limit value Vlimlow by the limiter process, the load operating information will not change and the comparison becomes difficult. Therefore, it is preferable to prevent the distribution voltage command value Vref from being fixed to the upper limit value Vlimhi or the lower limit value Vlimlow in the acceptable range R in the limiter process.

Controller 30 then performs the following process using the upper limit value Vlimhi and the lower limit value Vlimlow in the acceptable range R so that the distribution voltage command value Vref is not fixed to the upper limit value Vlimhi or the lower limit value Vlimlow in the acceptable range R while limiting the distribution voltage command value Vref within the acceptable range R.

When the distribution voltage command value Vref is less than the lower limit value Vlimlow in the acceptable range R, controller 30 reverses the sign of the adjustment direction flag F as indicated by the following Equation (4) and updates the distribution voltage command value Vref as indicated by the following Equation (5) so that the distribution voltage command value Vref is set to a value higher than the lower limit value Vlimlow by a minute voltage ΔV.

$$F = F \times (-1) \quad (4)$$

$$Vref = Vlimlow + (\Delta V \times F) \quad (5)$$

On the other hand, when the distribution voltage command value Vref exceeds the upper limit value Vlimhi in the acceptable range R, controller 30 reverses the sign of the adjustment direction flag F as indicated by the following Equation (6) and updates the distribution voltage command value Vref as indicated by the following Equation (7) so that the distribution voltage command value Vref is set to a value lower than the upper limit value Vlimhi by a minute voltage ΔV.

$$F = F \times (-1) \quad (6)$$

$$Vref = Vlimhi + (\Delta V \times F) \quad (7)$$

With such a process repeated, the distribution voltage command value Vref is adjusted in a range included in the acceptable range R such that the power consumption of load 3 is minimized (minimal).

In the distribution voltage control mode, the distribution voltage command value Vref is adjusted such that the actual power consumption of load 3 is minimized (minimal), and therefore, even when the characteristics of load 3 have changed due to the connection environment between load 3 and power supply system 1 or degradation of load 3 over time, the change can be followed. In other words, when the distribution voltage is determined by referring to a data table that defines the correspondence between current consumption and optimum voltage of a load in advance as in the system power source described in PTL 1, the characteristic change of the load is unable to be followed. By contrast, in the distribution voltage control mode according to the present embodiment, since the distribution voltage is adjusted using the actual power consumption of load 3, rather than using the data table defined in advance, the characteristic change of the load can be followed.

<Distribution Voltage Fixed Mode>

The distribution voltage fixed mode is an operation mode in which the distribution voltage command value Vref is determined and generated based on preset setting information or external command information applied from external device 4 such that excess or deficiency of distribution voltage does not occur even when the operating state of load 3 suddenly changes.

In other words, in the distribution voltage fixed mode, the distribution voltage command value Vref is controlled to a setting value preset by the setting information or an external command value specified by external device 4 such that excess or deficiency of distribution voltage does not occur, for example, at the time of operation sudden change of load 3.

<Switching of Operation Modes>

Power supply system 1 is configured to basically operate in the distribution voltage control mode for reduction of electricity expense and hence improvement in cost efficiency. However, in the distribution voltage control mode, the distribution voltage command value Vref is updated in units of minute voltage ΔV while detecting change in operating state of load 3 as described above. Thus, the time taken for the distribution voltage to converge to an optimal value is longer than the time taken for convergence of the operating state of load 3. Therefore, when the operation of load 3 abruptly fluctuates, the distribution voltage may become deficient or excessive to interrupt the operation of load 3.

In view of this, controller 30 is configured such that the operation mode switches from the distribution voltage control mode to the distribution voltage fixed mode when a predetermined switching condition is satisfied during the distribution voltage control mode.

The predetermined switching condition includes a condition that it is determined that the operation of load 3 will suddenly change or has suddenly changed. There are some possible methods to determine that the operation of load 3 will suddenly change or has suddenly changed. For example, controller 30 may acquire an operation command value for load 3 (for example, the rotational speed of a motor) from load state detector 20, and when the fluctuation rate of the acquired operation command of load 3 is equal to or greater than a threshold, controller 30 may determine that the operation of load 3 will suddenly change, and switch the operation mode to the distribution voltage fixed mode. For example, when load 3 is a motor, the load torque increases for acceleration to increase the rotation speed of the motor, and current flowing through load 3 increases simultaneously with increase of the load torque. Then, controller 30 may monitor current flowing into load 3 or power consumption acquired from load state detector 20 and, when the fluctuation rate thereof is equal to or greater than a threshold value, controller 30 may determine that the operation of load 3 has suddenly changed, and switch the operation mode to the distribution voltage fixed mode. With the switching as described above, a sufficient DC voltage can be supplied to load 3 in particular at the time of a sudden change of the load state, such as acceleration operation of the motor.

The predetermined switching condition may include a condition that load 3 is not yet started. At start-up of load 3, a transient voltage drop may occur due to rush current into a capacitor or the like connected in association with load 3, and this may cause deficiency of the distribution voltage. Therefore, at start-up of load 3, it is preferable that the distribution voltage is set to a sufficiently high voltage in advance, in consideration of a voltage drop. In view of this, the operation mode may be switched to the distribution voltage fixed mode in advance before start-up of load 3. For example, controller 30 may acquire information on a load operation command from load state detector 20 or external device 4 in advance, and when it is determined that load 3 is not yet started based on the acquired information, controller 30 may switch the operation mode to the distribution voltage fixed mode.

Controller 30 is configured such that the operation mode is switched (returned) from the distribution voltage fixed mode to the distribution voltage control mode when a predetermined return condition is satisfied during the distribution voltage fixed mode. The predetermined return condition includes a condition that it is determined that the operating state of load 3 has become stable or shifted to a steady operation.

For example, controller 30 may measure the mean value of power consumption of load 3 detected by load state detector 20 in certain cycles, and when the difference between the mean value of power consumption of load 3 this time and the previous value is within a prescribed value (for example, a few percent of rated power), controller 30 may determine that the operation of load 3 has become stable, and switch the operation mode to the distribution voltage control mode. For example, in a case where load 3 is a motor, controller 30 may determine that the operating state of load 3 has shifted to steady operation, when the detected value or the predicted value of rotation speed of the motor converges to the rotation speed command value of load 3, and controller 30 may switch the operation mode to the distribution voltage control mode.

The operation mode may be switched depending on the kinds of loads 3. For example, when load 3 is a load of a kind that has a priority on operation reliability, as in information devices, fluctuation of distribution voltage may adversely affect the operation of load 3. Furthermore, fluctuation of distribution voltage is not acceptable for some kinds of loads 3. When it is determined that load 3 is of such a kind, the operation mode may be set to the distribution voltage fixed mode.

Figure 3:
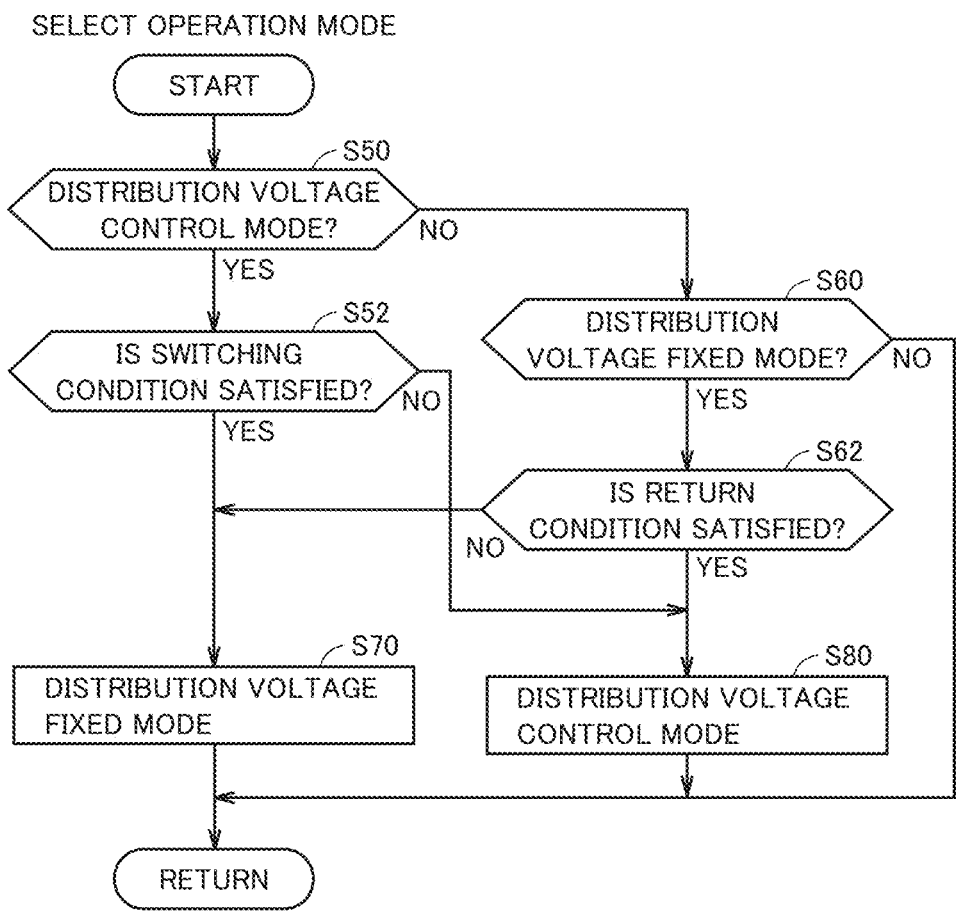
FIG. 3 is a flowchart showing an example of a process performed when the controller selects an operation mode.

FIG. 3 is a flowchart showing an example of a process performed when controller 30 selects an operation mode. This flowchart is repeatedly performed every time a predetermined condition is satisfied (for example, in predetermined cycles).

First of all, controller 30 determines whether the operation mode at present is the distribution voltage control mode (step S50). If the operation mode at present is the distribution voltage control mode (YES at step S50), controller 30 determines whether a predetermined switching condition is satisfied (step S52). The predetermined switching condition is as described above and will not be further elaborated.

If the predetermined switching condition is satisfied (YES at step S52), controller 30 selects the distribution voltage fixed mode as the operation mode (step S70). Thus, the operation mode is switched from the distribution voltage control mode to the distribution voltage fixed mode.

On the other hand, if the predetermined switching condition is not satisfied (NO at step S52), controller 30 selects the distribution voltage control mode as the operation mode (step S80). Thus, the operation mode is kept in the distribution voltage control mode.

If the operation mode at present is not the distribution voltage control mode (NO at step S50), controller 30 determines whether the operation mode at present is the distribution voltage fixed mode (step S60). If the operation mode at present is the distribution voltage fixed mode (YES at step S60), controller 30 determines whether a predetermined return condition is satisfied (step S62). The predetermined return condition is as described above and will not be further elaborated.

If the predetermined return condition is satisfied (YES at step S62), controller 30 selects the distribution voltage control mode as the operation mode (step S80). Thus, the operation mode is returned from the distribution voltage fixed mode to the distribution voltage control mode.

On the other hand, if the predetermined return condition is not satisfied (NO at step S62), controller 30 selects the distribution voltage fixed mode as the operation mode (step S70). Thus, the operation mode is kept in the distribution voltage fixed mode.

As described above, controller 30 according to the present embodiment selects an operation mode based on at least one of the load operating information from load state detector 20 and the external command information from external device 4 and switches the distribution voltage. Thus, in a situation in which the operation of load 3 suddenly changes, the distribution voltage is controlled in the distribution voltage fixed mode, thereby preventing interruption of operation of load 3 due to lack of voltage. Furthermore, in a situation in which the operation of load 3 is stable, the distribution voltage is adjusted to a value in accordance with the operation of load 3 in the distribution voltage control mode, thereby reducing power consumption of load 3.

In power supply system 1 according to the present embodiment, one power converter 10 is provided for a plurality of loads 3, and a data table defining the correspondence between current consumption and optimal voltage of load 3 need not be stored in advance. Therefore, the cost of the entire system can be reduced compared with when conversion circuits as many as loads and a data table are provided as described in PTL 1. As a result, power supply system 1 capable of improving load efficiency with lower costs can be provided.

<Modifications>

In the foregoing first embodiment, the distribution voltage control mode and the distribution fixed control mode are provided as the operation modes of controller 30.

However, in addition to the distribution voltage control mode and the distribution fixed control mode, other operation modes may be provided as the operation mode of controller 30. For example, as another operation mode, a distribution stop mode may be provided, in which when all loads 3 connected to DC power line L are stopped, power supply to DC power line L is stopped after elapse of a certain time. In the distribution stop mode, since the operation of power converter 10 can be stopped, standby electricity of power converter 10 can be reduced.

In the foregoing first embodiment, power supply system 1 is a DC power supply and distribution system, and power consumption of loads 3 is reduced by adjusting the voltage of DC power in the distribution voltage control mode.

However, power supply system 1 may be an AC power supply and distribution system that converts power received from main power source 2 (AC power or DC power) into AC power having an amplitude in accordance with a command value and supplies and distributes the converted AC power to loads. In this case, the distribution voltage is AC power, and power consumption of load 3 can be reduced by adjusting the amplitude of AC power by a method similar to that of the foregoing first embodiment in the update process of the distribution voltage command value Vref in the distribution voltage control mode (step S30 in FIG. 2). Furthermore, the upper limit value Vlimhi of the distribution voltage command value Vref is set to the upper limit value of amplitude of AC voltage, and the lower limit value Vlimlow of the distribution voltage command value Vref is set to the lower limit value of amplitude of AC voltage. The frequency of AC power is not adjusted, and supply of AC power is performed at a frequency defined according to the specifications of load 3 and the AC distribution system.

Second Embodiment

Figure 4:
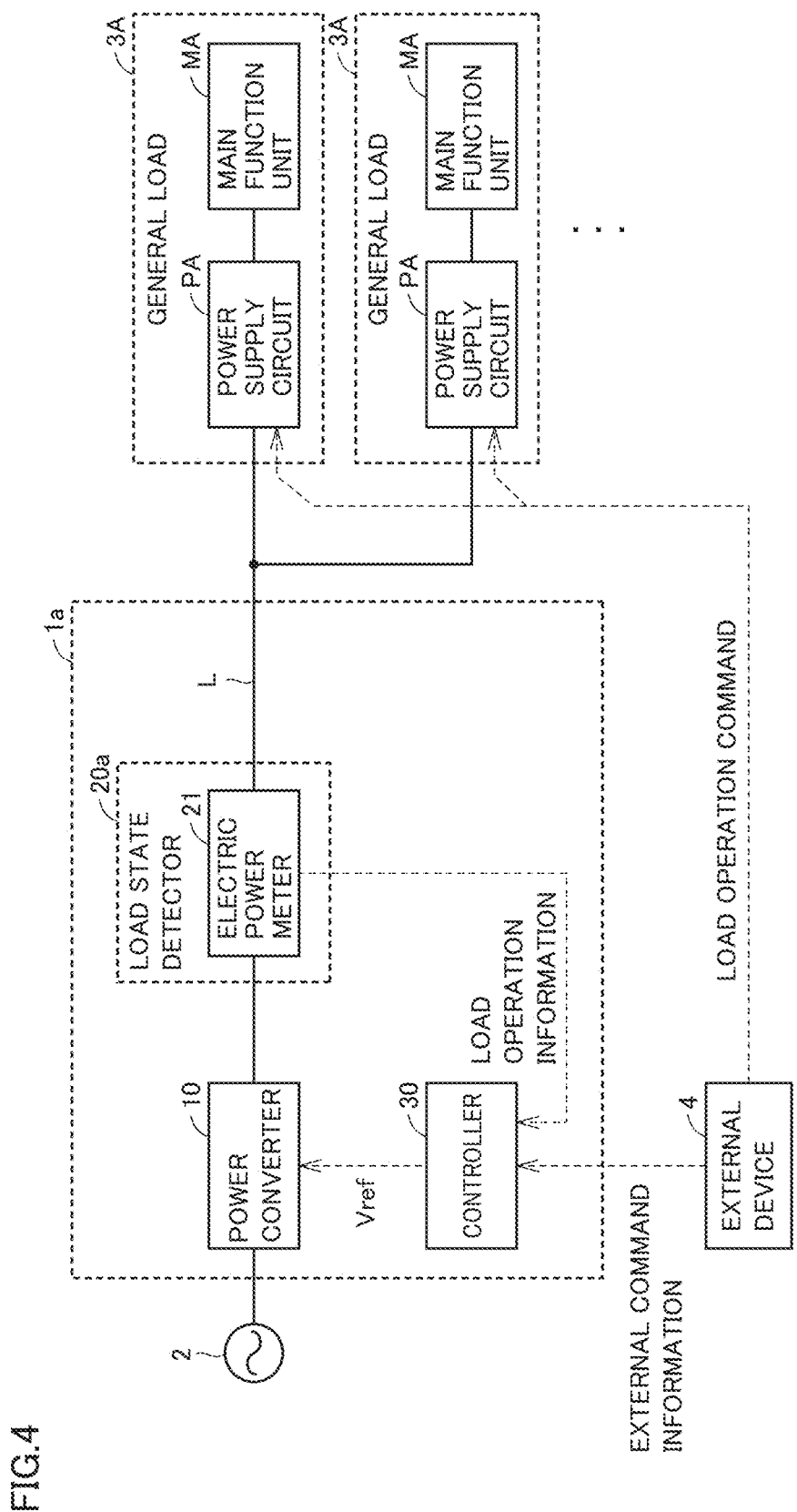
FIG. 4 is a second diagram schematically showing a configuration of a power supply system.

FIG. 4 is a diagram schematically showing a configuration of a power supply system 1a according to a second embodiment of the present invention. Power supply system 1a differs from power supply system 1 in FIG. 1 described above in that a plurality of load state detectors 20 are changed to a single load state detector 20a and loads 3 that are power supply destinations are changed to general loads 3A. The other structure is the same as that of the foregoing first embodiment and will not be further elaborated.

As shown in FIG. 4, power supply system 1a is connected to a plurality of general loads 3A. Each of general loads 3A includes a main function unit MA and a power supply circuit PA to supply power to main function unit MA. For example, when general load 3A is a lighting device, main function unit MA includes a light source such as a light emitting diode, and power supply circuit PA includes a power supply circuit for turning on the light source.

Load state detector 20a includes an electric power meter 21 to measure the sum of power consumption of a plurality of general loads 3A. Since the voltage required for general load 3A does not change so much with its operating condition, general load 3A can operate normally as long as a voltage within an input voltage limit range defined by the specifications is input to general load 3A. Therefore, in view of preventing interruption of operation of general load 3A, it is not necessary to detect the operating state of each individual general load 3A. In view of this, load state detector 20a according to the present embodiment measures the sum of power consumption of a plurality of general loads 3A collectively and outputs the measured sum as load operating information to controller 30. Thus, compared with when a load state detector is provided for each individual general load 3A, the number of load state detectors can be reduced, which contributes to cost reduction.

Some of general loads 3A are inoperable at start-up unless a sufficient DC voltage is supplied at start-up. Furthermore, when a plurality of general loads 3A are started simultaneously, the voltage of DC power transiently drops due to rush current at start-up of general loads 3A. Therefore, if the distribution voltage control mode is selected and the distribution voltage is adjusted to be relatively low, the voltage may be deficient due to a transient voltage drop, and the starting may fail.

Then, controller 30 according to the present second embodiment switches the operation mode to the distribution voltage fixed mode when general load 3A that requires a sufficient DC voltage at start-up is started, or when a plurality of general loads 3A are started simultaneously. The switching to the distribution voltage fixed mode may be performed when controller 30 receives a switching request from external device 4 that controls a start-up signal for a plurality of general loads 3A, or may be performed when controller 30 receives a switching request from general load 3A itself In FIG. 4, the distance between power converter 10 and load state detector 20a is minimized so that the wiring part from load state detector 20a to a plurality of general loads 3A can be incorporated into the general load 3A side and subjected to the distribution voltage control mode. Thus, the distribution voltage, including loss due to the wiring between power converter 10 and general load 3A, can be adjusted.

Figure 5:
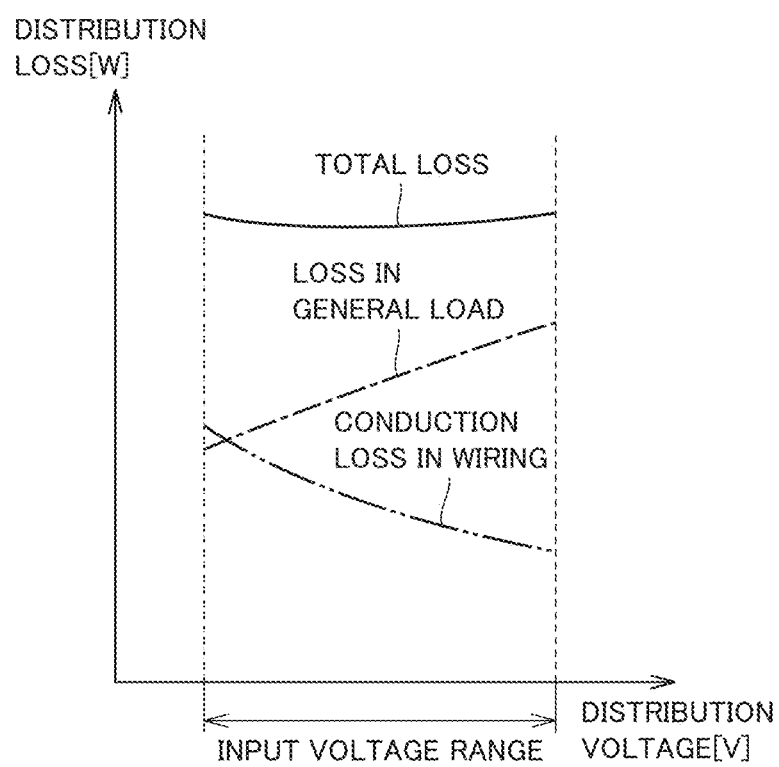
FIG. 5 is a diagram showing an example of correspondence between distribution voltage and distribution loss.

FIG. 5 is a diagram showing an example of correspondence between distribution voltage and distribution loss. In FIG. 5, the horizontal axis shows distribution voltage (unit: V), and the vertical axis shows distribution loss (unit: W). In FIG. 5, the dashed and dotted line shows loss in general load 3A, the dashed-two dotted line shows conduction loss in the wiring, and the solid line shows the total loss of these.

The loss in general load 3A is reduced by minimizing the difference between the voltage output by power supply circuit PA to main function unit MA and the distribution voltage received by power supply circuit PA from power supply system 1a. Therefore, loss in general load 3A decreases as the distribution voltage is lower, as indicated by the dashed and dotted line.

On the other hand, conduction loss in the wiring is proportional to the square of a value of current flowing in the wiring, and when power consumption of general load 3A is constant, current flowing through the wiring increases as the distribution voltage decreases. Therefore, the conduction loss in the wiring decreases as the distribution voltage is higher, as indicated by the dashed-two dotted line.

It is therefore preferable that the distribution voltage is adjusted such that not only the loss in general load 3A but also the total loss (solid line) of the loss in general load 3A and the conduction loss in the wiring is minimized. Controller 30 according to the present second embodiment can adjust the distribution voltage command value Vref such that the sum of power consumption including the wiring from load state detector 20a to a plurality of general loads 3A is minimized in the distribution voltage control mode. As a result, the distribution voltage can be adjusted such that the total loss shown in FIG. 4 is minimized.

Third Embodiment

Figure 6:
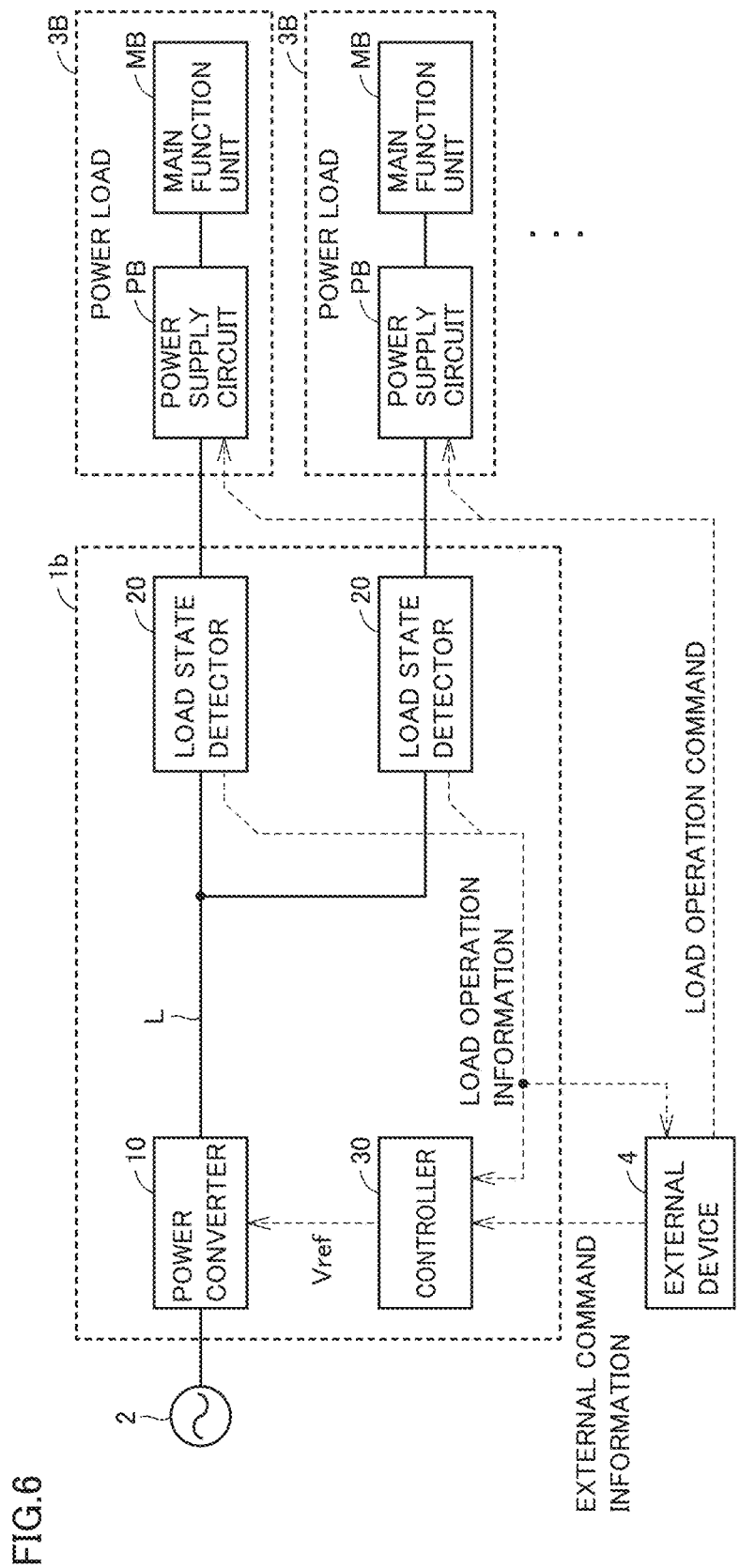
FIG. 6 is a third diagram schematically showing a configuration of a power supply system.

FIG. 6 is a diagram schematically showing a configuration of a power supply system 1b according to a third embodiment of the present invention. Power supply system 1b differs from power supply system 1 in FIG. 1 described above in that loads 3 that are power supply destinations are changed to power loads 3B. The other structure is the same as that of the foregoing first embodiment and will not be further elaborated.

Power load 3B includes a main function unit MB including a motor necessary for implementing a function such as a compressor and a conveyor, and a power supply circuit PB to supply power to main function unit MB and control the operation of the motor included in main function unit MB.

Load state detector 20 outputs information including current flowing through power load 3B or power consumption and the operating state of power load 3B (for example, the rotation speed of the motor or a rotation speed command value, output voltage of power supply circuit PB, etc.) acquired from power load 3B, as load operating information, to controller 30. Load state detector 20 also outputs the load operating information to external device 4 that centrally controls the state of power loads 3B.

DC voltage necessary for the operation of power load 3B varies with its operating state. Furthermore, when the state of power load 3B fluctuates, a voltage for control operation of power load 3B is required in addition to a DC voltage necessary for power load 3B after fluctuation of the state. It is therefore preferable that the magnitude of distribution voltage has a margin to some extent. Therefore, it is preferable that the operation mode is switched to the distribution voltage fixed mode because, with the distribution voltage control mode in which distribution voltage is successively varied while the load operating state is detected, the distribution voltage may be deficient and the control operation on the operating state of power load 3B may be interrupted.

Then, controller 30 according to the present third embodiment switches the operation mode to the distribution voltage fixed mode when the operating state of power load 3B suddenly changes. The switching to the distribution voltage fixed mode may be performed when controller 30 receives a switching request from external device 4 or load state detector 20, may be performed when controller 30 receives a switching request from power load 3B itself, or may be performed when controller 30 determines that the operating state of power load 3B will suddenly change, based on information from external device 4 or load state detector 20 (a rotation speed command for the motor, etc.).

When the operation mode is switched to the distribution voltage fixed mode, controller 30 sets the distribution voltage command value Vref to, for example, a preset setting value or an external command value specified by external command information from external device 4 and outputs the set distribution voltage command value Vref to power converter 10.

Figure 7:
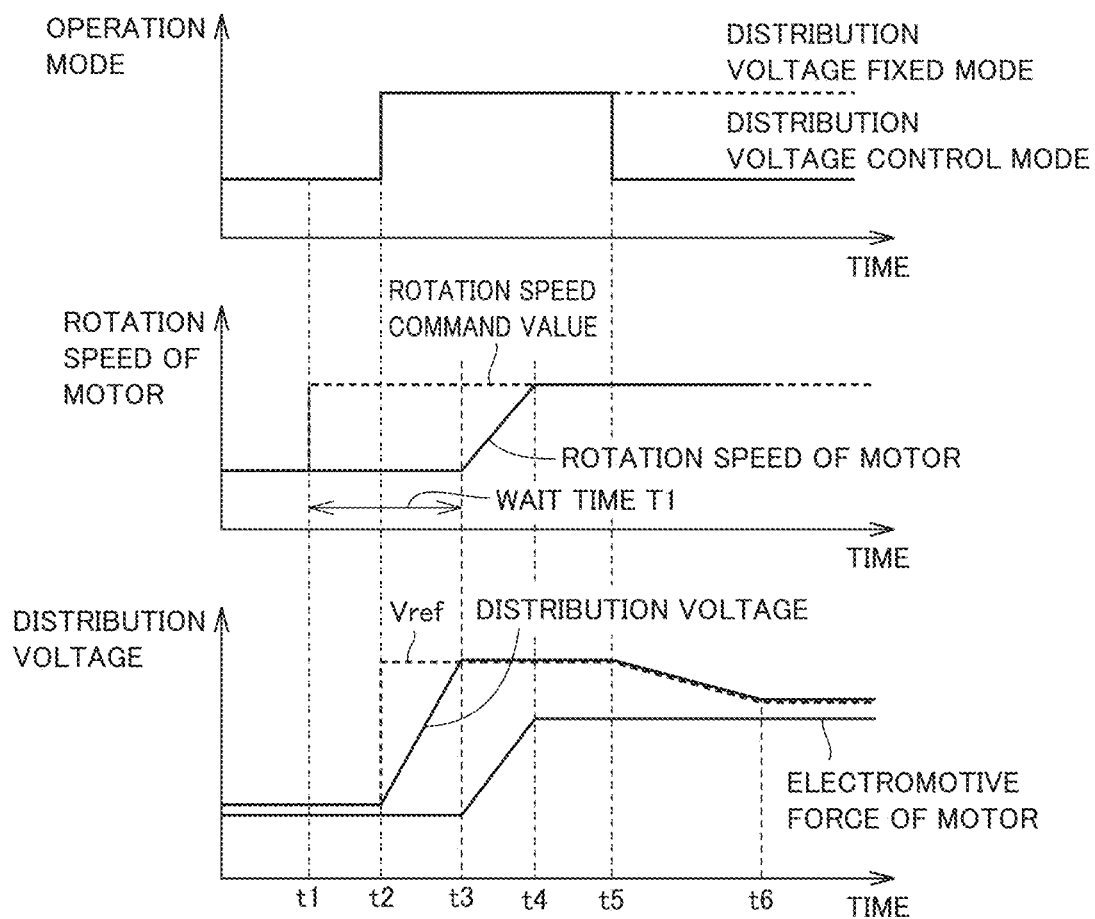
FIG. 7 is a diagram showing an example of change in operation mode of the controller.

FIG. 7 is a diagram showing an example of change in operation mode of controller 30 in a case where the rotation speed of the motor included in power load 3B suddenly changes. In FIG. 7, the horizontal axis shows time, and the vertical axis shows the operation mode of controller 30, the rotation speed of the motor, and the distribution voltage, in order from above.

Before time t1, the operation mode of controller 30 is set to the distribution voltage control mode. When the rotation speed command value for the motor rapidly increases at time t1, at the subsequent time t2, controller 30 switches the operation mode from the distribution voltage control mode to the distribution voltage fixed mode. Whether the rotation speed command value of the motor has rapidly increased may be determined by external device 4 or load state detector 20 as described above, or may be determined by controller 30 based on information from external device 4 or load state detector 20.

At time t2, with the switching to the distribution voltage fixed mode, the distribution voltage command value Vref is increased to a preset setting value or an external command value specified by external device 4. With this, the distribution voltage starts increasing at time t2 and reaches the distribution voltage command value Vref at time t3.

On the other hand, the rotation speed of the motor is kept at a value before the rotation speed command value rapidly changes, until a prescribed wait time T1 elapses since time t1 when the rotation speed command value rapidly changes. At time t3 when the wait time T1 has elapsed, the rotation speed of the motor starts increasing, and at time t4, the rotation speed of the motor reaches the rotation speed command value.

At the subsequent time t5, when it is determined that the rotation speed of the motor is controlled to the rotation speed command value, controller 30 determines that the motor has become stable in a steady state, and switches the operation mode to the distribution voltage control mode again. Thus, the distribution voltage command value Vref is adjusted to a value in accordance with the state of the motor.

In the distribution voltage control mode, the upper limit value Vlimhi and the lower limit value Vlimlow of the distribution voltage command value Vref are set based on electromotive force of the motor included in power load 3B. Therefore, the distribution voltage command value Vref is prevented from being adjusted to a value below the electromotive force of the motor.

A series of these operations is performed to avoid deficiency or excess of distribution voltage even for rapid operation fluctuation of power load 3B.

Fourth Embodiment

Figure 8:
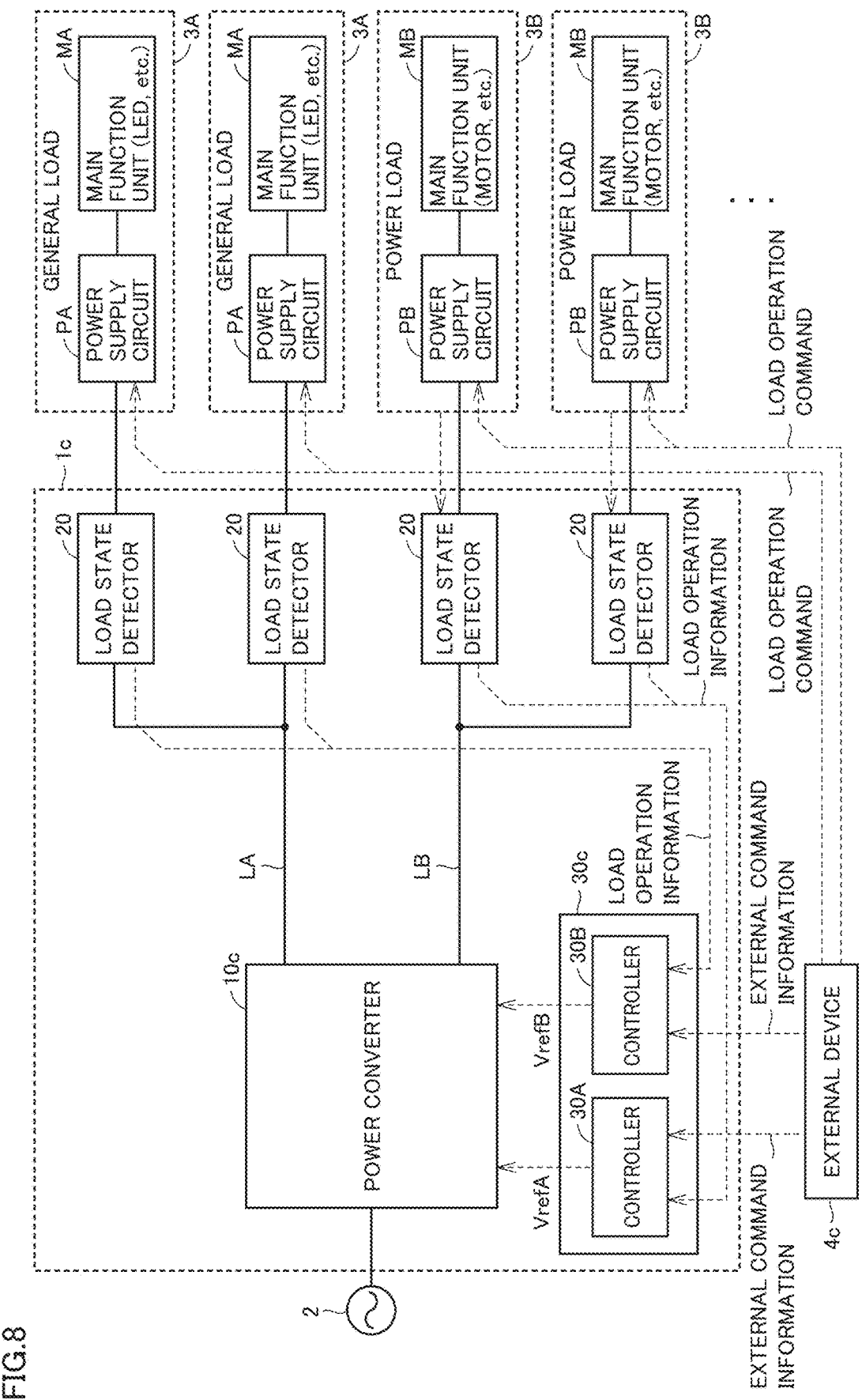
FIG. 8 is a fourth diagram schematically showing a configuration of a power supply system.

FIG. 8 is a diagram schematically showing a configuration of a power supply system 1c according to a fourth embodiment of the present invention. Power supply system 1c is a DC power supply and distribution system that converts AC power supplied from main power source 2 into DC power and supplies and distributes the converted DC power to a plurality of general loads 3A and power loads 3B. A plurality of general loads 3A and power loads 3B are controlled by a load operation command received from external device 4c separate from power supply system 1c.

Power supply system 1c includes a power converter 10c, two DC power lines LA and LB, a plurality of load state detectors 20, and a controller 30c.

Power converter 10c is connected to main power source 2. Power converter 10c is also connected to a plurality of general loads 3A through DC power line LA and connected to a plurality of power loads 3B through DC power line LB. In this way, in the present fourth embodiment, two DC power lines LA and LB are provided, and the loads connected to each DC power line L are of the same kind.

Since the operation characteristics of loads usually vary with the kinds of loads, distribution voltages suitable for loads also vary with the kinds of loads. Since power supply system 1 shown in FIG. 1 described above has only a single DC power line L, it is difficult to adjust the distribution voltage of each load, if loads of different kinds are connected. By contrast, in power supply system 1c according to the present fourth embodiment, since two DC power lines LA and LB are provided for two kinds of loads, namely, general loads 3A and power loads 3B, a distribution voltage suitable for each of two kinds of loads is easily supplied. When there are three or more kinds of loads connected to power converter 10, DC power lines as many as the kinds of loads are provided.

Power converter 10c converts AC power supplied from main power source 2 into DC powers with two voltages respectively corresponding to distribution voltage command values VrefA and VrefB received from controller 30c and outputs the converted DC powers with two voltages to DC power lines LA and LB.

Power converter 10c may directly convert AC power supplied from main power source 2 into two DC powers or may temporarily convert it into a single DC power, which is in turn converted into a plurality of DC powers. In any case, power converter 10 is configured to control power supply to DC power line LA and power supply to DC power line LB separately.

Controller 30c includes controllers 30A and 30B respectively corresponding to two DC power lines LA and LB. Controller 30A determines a distribution voltage command value VrefA for DC power line LA based on load operating information of a plurality of general loads 3A connected to DC power line LA and outputs the determined distribution voltage command value VrefA to power converter 10c. Similarly, controller 30B determines a distribution voltage command value VrefB for DC power line LB based on load operating information of a plurality of power loads 3B connected to DC power line LB and outputs the determined distribution voltage command value VrefB to power converter 10c.

The operation mode of controller 30A and the operation mode of controller 30B can be set independently. For example, when general loads 3A connected to DC power line LA include a load, such as a server, requiring high operation reliability, the operation mode of controller 30A may be fixed to the distribution voltage fixed mode in order to enhance its operation reliability. On the other hand, when power loads 3B connected to DC power line LB include a load such as an air conditioning device, the operation mode of controller 30B may be basically set to the distribution voltage control mode and the operation mode may be switched to the distribution voltage fixed mode in accordance with the operating state of load 3, because it is acceptable to vary the distribution voltage in accordance with the operation of power loads 3B. In this way, whether to switch the operation mode and the setting of a basic operating mode may be set separately in DC power lines LA and LB.

As described above in power supply system 1c in the present fourth embodiment, controllers 30A and 30B respectively corresponding to DC power lines LA and LB are installed. Therefore, distribution voltages can be adjusted separately in DC power lines LA and LB.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST 1, 1a, 1b, 1c power supply system, 2 main power source, 3 load, 3A general load, 3B power load, 4, 4c external device, 10, 10c power converter, 20, 20a load state detector, 21 electric power meter, 30, 30A, 30B, 30c controller, L, LA, LB DC power line, M, MA main function unit, PA, PB, PS power supply circuit.

The invention claimed is:
1. A power supply system to supply power to a load, the power supply system comprising:
a converter to convert AC power or DC power received from a main power source into power with a voltage in accordance with a voltage command value and supply the converted power to the load;

a detector to detect an operating state of the load; and a controller to operate in an operation mode selected from among a plurality of operation modes and generate the voltage command value, the operation modes including
a first mode in which the voltage command value is generated based on the operating state of the load detected by the detector such that power consumption of the load is reduced, and
a second mode in which the voltage command value is a fixed value that is generated based on predetermined setting information or external command information acquired from an external device such that there is no excess or deficiency of the voltage of the power output from the converter, and the converter converting AC power or DC power received from the main power source into DC power with a voltage in accordance with the voltage command value and supplying the converted DC power to the load, wherein the controller selects the second mode when a sudden change of the operating state of the load is detected, and the controller selects the first mode when it is detected that the operating state of the load has shifted to a steady operation.

2. The power supply system according to claim 1, wherein when operating in the first mode, the controller determines an acceptable range of the voltage command value based on at least one of an operating state of the load, the setting information, and the external command information, and limits the voltage command value such that the voltage command value falls within the acceptable range.

3. The power supply system according to claim 1, wherein the controller selects the operation mode based on the external command information.

4. The power supply system according to claim 1, wherein the detector detects at least one of power consumption and current of the load as an operating state of the load, and the controller selects the operation mode based on a fluctuation rate of the power consumption of the load detected by the detector or a fluctuation rate of the current detected by the detector.

5. The power supply system according to claim 1, wherein the controller selects the second mode at start-up of the load and selects the first mode after the start-up of the load.

6. The power supply system according to claim 1, wherein the converter is configured to supply power to a plurality of power distribution systems, and
the controller includes a plurality of the controllers respectively corresponding to the power distribution systems.

7. The power supply system according to claim 4, wherein in a case that the voltage command value falls below or above the acceptable range, the controller reverses a sign of an adjustment amount of the voltage command value to cause the voltage amount value to fall within the acceptable range.

8. The power supply system according to claim 1, wherein when the load is an electric motor, the controller selects the second mode when acceleration of the motor is detected, and the controller selects the first mode after detecting that the motor has entered steady state.

9. The power supply system according to claim 8, wherein the controller detects the acceleration of the motor when current or power consumed by the motor increases beyond a predetermined threshold.

10. The power supply system according to claim 9, wherein the controller determines a mean power consumption of the motor and selects the first mode when the mean power consumption reaches a predetermined level after acceleration.

11. The power supply system according to claim 5, wherein the controller determines a mean power consumption of the load and selects the first mode when the mean power consumption reaches a predetermined level after start-up of the load.

12. The power supply system according to claim 1, wherein the controller selects the operation mode based on a type of the load.

13. The power supply system according to claim 12, wherein the controller selects the second mode when the type of the load indicates a prioritized load.

14. The power supply system according to claim 1, wherein the controller operates in the first operation mode by default.

15. The power supply system according to claim 1, wherein the controller stops supply of power to the load when operation of the load stops.

16. The power supply system according to claim 15, wherein the controller waits a predetermined amount of time before stopping supply of power to the load when the operation of the load stops.

17. The power supply system according to claim 16, wherein to stop supply of power to the load, the controller causes the converter to stop operation.

18. The power supply system according to claim 1, wherein the controller acquires an operation command value for the load, and selects the second mode when a fluctuation rate of the acquired operation command is equal to or greater than a threshold.

* * * * *